United States Patent [19]
Hoyt et al.

[11] Patent Number: 6,104,671
[45] Date of Patent: Aug. 15, 2000

[54] APPARATUS AND METHOD FOR MEASURING THE RELATIVE VELOCITY AND TRUE DISTANCE BETWEEN TWO OBJECTS

[75] Inventors: Reed W. Hoyt, 23 Willowbrook Rd., Framingham, Mass. 01701; John F. Lanza, 20 Third St., Naticy, Mass. 01760

[73] Assignees: Reed W. Hoyt; John F. Lanza

[21] Appl. No.: 08/623,600

[22] Filed: Mar. 28, 1996

[51] Int. Cl.[7] .............................. G01S 15/50; G01S 15/00
[52] U.S. Cl. .............................. 367/99; 367/124; 367/127
[58] Field of Search .............................. 367/99, 908, 118, 367/120, 124, 127, 89, 105; 342/106, 109, 125

[56] References Cited

U.S. PATENT DOCUMENTS

| | | | |
|---|---|---|---|
| 3,732,566 | 5/1973 | Schubring | 342/109 |
| 4,112,756 | 9/1978 | MacLennan et al. | 73/181 |
| 4,282,589 | 8/1981 | Evetts et al. | 367/90 |
| 4,290,125 | 9/1981 | Honda | 367/87 |
| 4,442,513 | 4/1984 | Mead | 367/100 |
| 4,456,982 | 6/1984 | Tournois | 367/11 |
| 4,634,947 | 1/1987 | Magori | 367/96 X |
| 4,740,045 | 4/1988 | Goodson et al. | 342/112 |
| 4,831,604 | 5/1989 | McKnight et al. | 367/99 |
| 4,960,329 | 10/1990 | Schofield | 367/101 X |
| 5,199,299 | 4/1993 | Hughes et al. | 367/137 X |
| 5,206,652 | 4/1993 | Hoyt et al. | 342/52 |

*Primary Examiner*—Ian J. Lobo
*Attorney, Agent, or Firm*—Charles H. Harris; John Francis Moran; Elizabeth Arwine

[57] ABSTRACT

An apparatus and method for measuring the true distance and relative velocity between first and second objects. The apparatus comprises a transceiver located at the first object which measures a first transit time for the transmission of a first signal from a first object to a second object and for the reflection of the first signal from the second object back to the first object. The transceiver further measures a second transit time for the transmission and reflection of a second signal, the second signal being transmitted immediately upon the reflection of the first signal back to the first object. First and second transit times can be used to calculate first and second apparent distances between the first and second objects, respectively. The apparatus also includes calculating means for determining the relative velocity between the first and second objects using the first transit time and the second transit time. The calculating means calculates the true distance between the first and second objects at the time of reflection of the second signal by modifying the second apparent distance in accordance with the relative velocity between the first and second objects during the time of transmission and reflection of the second signal.

10 Claims, 2 Drawing Sheets

APPARATUS AND METHOD FOR MEASURING THE RELATIVE VELOCITY AND TRUE DISTANCE BETWEEN TWO OBJECTS

The U.S. government has a royalty-free nonexclusive license to make and use the present invention for government purposes.

BACKGROUND OF THE INVENTION

The present invention relates generally to distance measurement systems, and more particularly, to systems for measuring the distance between two objects under dynamic conditions.

The prior art has established numerous techniques for measuring the distance between two objects.

One technique commonly employed to measure the distance between two object involves the use of acoustic and/or ultrasonic waves. For example, in U.S. Pat. No. 4,831,604 to McKnight et al, there is disclosed equipment for ultrasonic range finding. The range finding equipment is employed in a nuclear reactor to monitor the spacing between structural components of the reactor which are under stress. A manipulator carries a pair of send-receive ultrasonic transducers arranged back to back so as to direct ultrasound signals towards reflectors associated with the structural components to be monitored. The transducers are pulsed with signals derived by gating a few cycles of a sustained reference signal of sine wave form and the resulting echo signals can be used to provide transit time and phase displacement information from which the spacing between the reflectors can be derived with a high degree of precision.

The use of ultrasonic and/or acoustic waves in measuring relatively short distances (those distances which are approximately less than 300 feet) between two static objects is an extremely accurate and inexpensive technique as compared to alternative techniques. However, due the relatively slow speed at which ultrasonic/acoustic waves travel, as well as the lack of intensity of said waves, the use of acoustic and ultrasonic waves has been found to be ineffective when used to measure substantial distances between two objects under dynamic conditions. Specifically, because the speed of sound waves is relatively slow, the transit time required for an acoustic or ultrasonic wave to travel from an object to a target and back to the primary object can become quite lengthy when used to measure substantial distances. As a consequence, if the objects to be measured are in motion, it is conceivable that the distance between the objects could change considerably during the measurement period. The movement of the objects during the measurement period will result in an inaccurate measurement of the distance between the two objects (the resulting measurement hereinafter being referred to as an apparent distance measurement between the two objects).

Another technique employed to measure the distance between two objects involves the use of radar, and particularly Doppler radar. Due to the extremely high speed and intensity of radar waves, the use of radar has been found to be extremely accurate and effective in measuring large distances between two objects (e.g. 1000 feet or more). However, for the measurement of short distances, radar has been found to be unreliable and extremely expensive, particularly when compared to the use of acoustic and/or ultrasonic rangefinders.

It should be noted, however, that radar is extremely effective in measuring the relative velocity between two objects at short distances. As a result, radar has been used in the art to accommodate for the movement of the objects during the measurement period of acoustic or ultrasonic rangefinders. The calculation of the relative velocity between objects using radar has been used to determine the distance traveled by the target and/or source during an acoustic or ultrasonic measurement period, which in turn is used to convert the apparent distance between two objects into the true distance between the two objects.

As an example, in U.S. Pat. No. 5,206,652 to Hoyt et al, there is disclosed a height measurement system which uses an inexpensive ultrasonic device to provide an apparent height of a descending airborne object. To compensate for movement of the object during the ultrasonic measurement, a Doppler radar velocity measuring device determines the vertical velocity in a short measurement period. The measured vertical velocity is used to determine the vertical distance travelled during the ultrasonic measurement and to compensate therefor by converting the apparent height to a true height of the descending object. Updates of the true height may be obtained by storing the vertical velocity and retrieving the vertical velocity for multiplication by a time value to obtain an updated value of the true height.

It should be noted that although quite effective, the implementation of radar in the measurement of relatively short distances between objects under dynamic conditions can make the system very costly.

SUMMARY OF THE INVENTION

It is an object of the present invention to provide a new and improved distance measurement system.

It is another object of the present invention to provide a measurement system as described above which accurately determines the distance between two objects under dynamic conditions.

It is yet another object of the present invention to provide a measurement system as described above which measures the distance between two objects under dynamic conditions using acoustic and/or ultrasonic waves.

It is still another object of the present invention to provide a measurement system as described above which corrects for measurement errors resulting from the movement of the objects during the measurement period.

It is another object of the present invention to provide a measurement system as described above which determines the relative velocity between the two objects and adjusts the apparent distance accordingly to determine the true distance between the two objects under dynamic conditions.

It is a further object of the present invention to provide a distance measurement system as described above in which both relative velocity and true distance can be derived from data collected by a single transceiver.

Accordingly, there is provided a method for measuring the true distance and relative velocity between first and second objects, said method comprising the steps of measuring a first transit time for the transmission and reflection of a first signal between the first and second objects, said first transit time being used to determine a first apparent distance between the first and second objects, measuring a second transit time for the transmission and reflection of a second signal between the first and second objects, said second transit time being used to determine a second apparent distance between the first and second objects, wherein the second signal is transmitted immediately upon the reflection of the first signal back to the first object, calculating the relative velocity between the first and second objects using said first and second transit times, and calculating the true distance between the first and second objects at the time of reflection of the second signal back to the first object by modifying the second apparent distance in accordance with the relative velocity between the first and second objects during the time of transmission and reflection of the second signal.

According to another feature of the invention, there is provided an apparatus for measuring the true distance and relative velocity between first and second objects, comprising a transceiver located at the first object, said transceiver measuring a first transit time for the transmission and reflection of a first signal between the first and second objects, said first transit time being used to determine a first apparent distance between the first and second objects, wherein said transceiver measures a second transit time for the transmission and reflection of a second signal between the first and second objects, said second transit time being used to determine a second apparent distance between the first and second objects, wherein the second signal is transmitted immediately upon the reflection of the first signal back to the first object, and calculating means for determining the relative velocity between the first and second objects using said first transit time and said second transit time, wherein said calculating means calculates the true distance between the first and second objects at the time of reflection of the second signal back to the first object by modifying the second apparent distance in accordance with the relative velocity between the first and second objects during the time of transmission and reflection of the second signal.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of an illustration of an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate an embodiment of the invention and, together with the description, serve to explain the principles of the invention. In the drawings wherein like reference numerals represent like parts.

DETAILED DESCRIPTION OF A PREFERRED EMBODIMENT

Figure 1:
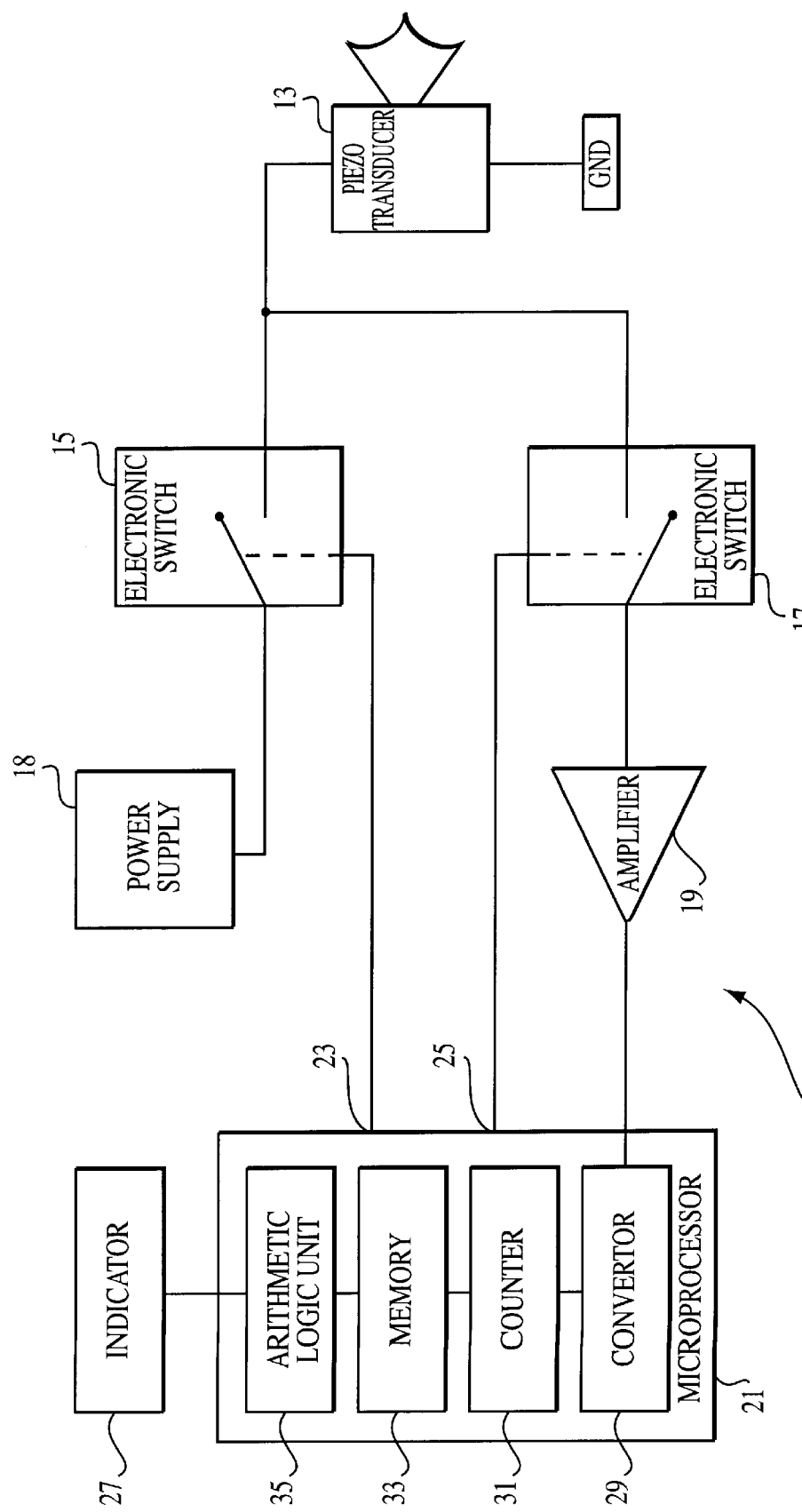
FIG. 1 is a block diagram of the system of the present invention.
Figure 2A:
FIG. 2 is a timing chart showing the system of the present invention transmitting and receiving a pair of pulses between and object and a target.
Figure 2B:
Figure 2C:
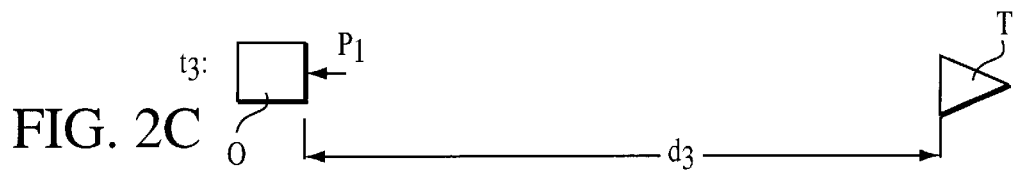
Figure 2D:
Figure 2E:
Figure 2F:
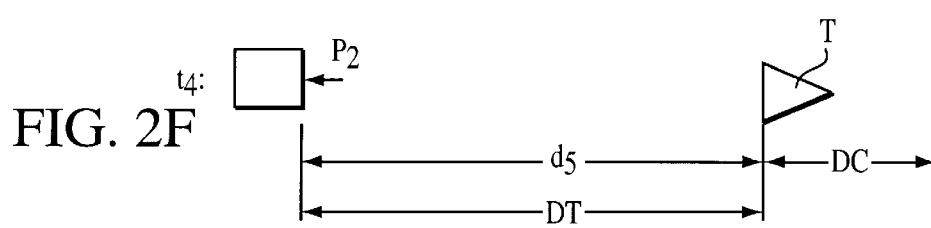

Referring now to the drawings, there is shown in FIG. 1 a system constructed according to the teachings of the present invention, the system being represented generally by reference numeral 11. System 11, located at an object O, can be used to measure the true distance and relative velocity between object O and a target T through the transmission and reflection of two or more acoustic or ultrasonic waves.

System 11 comprises five basic components: a piezo transducer 13, a pair of electronic switches 15 and 17, an amplifier 19, and a microprocessor 21.

Piezo transducer 13 is a transceiver capable of transmitting and receiving waves of a common frequency. Piezo transducer 13 may be a device of the pulse echo device. Such devices function conventionally by transmitting a pulse to a target and detecting the resulting echo. Inasmuch as the velocity of sound in the medium separating the two objects is fixed, the time between transmission of the pulse and detection of the returning echo is a linear function of the distance between the two objects. Thus, measurement of the elapsed time is equivalent to measurement of the distance between the objects and, using known techniques, is easily converted to represent that distance. For the purposes of this invention, piezo transducer 13 transmits and receives acoustic and ultrasonic waves; however, it should be noted that transducer 13 is not limited to the communication of waves of acoustic and/or ultrasonic frequencies.

Piezo transducer 13 is electrically connected to electronic switches 15 and 17 and a ground GND. Electronic switches 15 and 17 are MOSFET digitally controlled switches. Switches 15 and 17 are field effect transistors having a large current capacity that is turned on or off by applying a logic high or logic low signal to the transistor, respectively. Switch 15 is further electrically connected to a power supply 18 and microprocessor 21. Switch 17 is further electrically connected to microprocessor 21 and amplifier 19.

Amplifier 19 is electrically connected to switch 17 and microprocessor 21. Amplifier 19 is a high input impedance amplifier which is used to amplify a signal.

Microprocessor 21 is electrically connected to switches 15 and 17 at digital output pins 23 and 25, respectively. Microprocessor 21 is further electrically connected to amplifier 19 and an indicator 27.

Microprocessor 21 comprises an analog-to-digital convertor 29, a counter 31, a random access memory (RAM) 33, and an arithmetic logic unit (ALU) 35. Convertor 29 is a 12 bit analog to digital convertor which is electrically connected to amplifier 19. Convertor 29 is electrically connected to counter 31. Counter 31 is electrically connected to RAM 33. RAM 33 is 16 bytes or more of onboard static random access memory. RAM 33 is electrically connected to ALU 35, which in turn, may be electrically connected to indicator 27.

In use, system 11 functions in the following manner: microprocessor 21 initializes system 11 by applying a logic low signal to digital output pins 23 and 25 which, in turn, is applied to electronic switches 15 and 17. The application of a logic low signal causes switches 15 and 17 to be in the open position. With switches 15 and 17 in the open position, microprocessor 21 then sends a first pulse train of square waves $P_1$ having a frequency F to digital output pin 23. Each time first pulse train of square waves $P_1$ goes logic high, electronic switch 15 will close causing power supply 18 to apply a voltage to piezo transducer 13. Each time first pulse train of square waves $P_1$ returns to logic low, electronic switch 15 will open, switching off the power to transducer 13. This continues at frequency F until the pulse train is complete.

First pulse train of square waves $P_1$ of frequency F causes piezo transducer 13 to transmit a wave of frequency F for the length of first pulse train $P_1$. At the end of first pulse train $P_1$, electronic switch 15 returns to an open position. At this point, microprocessor 21 then sends a logic high signal to digital output pin 25 which causes switch 17 to close. Piezo transducer 13 then acts as a receiver and receives the return echo of first pulse train $P_1$ transmitted by transducer 13. If transmitted first pulse train $P_1$ is received by transducer 13 within a preset time period, pulse $P_1$ travels through switch 17 and is applied to amplifier 19. It should be noted that if transmitted first pulse $P_1$ is not received by transducer 13 within the preset time period, microprocessor 21 will treat the target as if it is out of range and will reset system 11 to the transmit mode.

The echo of first pulse train $P_1$ is amplified by amplifier 19 and is applied to analog-to-digital convertor 29 in microprocessor 21. Convertor 29 converts the analog pulse to a digital representation. As a means to filter out other waves, microprocessor 21 then determines whether the received signal is within frequency range F of the originally transmitted pulse.

During the period between transmission and reception of first pulse train $P_1$, counter 31 in microprocessor 21 is incremented by 1 unit every 0.1 msec, which corresponds to the time for an acoustic pulse to travel about 0.1125 feet. Counter 31 increments continuously until the echo of first pulse $P_1$ is received and processed by microprocessor 21. When microprocessor 21 receives the echo of first pulse $P_1$, counter 31 is immediately stopped and a first counter value CVAL1, held by counter 31, is stored in random access memory 33. Counter 31 is then immediately reset to zero for measurement of the transit time for the next pulse train.

When microprocessor 21 receives the echo of first pulse $P_1$ and stores first counter value CVAL1 in RAM 33, system 11 immediately transmits a second pulse train $P_2$ of frequency F. Second pulse $P_2$ is transmitted and received in the same manner as $P_1$, the length of the transmission and reception period of second pulse $P_2$ being represented by counter value CVAL2. Similarly, additional pulses can be transmitted and received with the transit time of each pulse being stored in RAM 33.

Referring now to FIG. 2, there is shown a timing chart for the transmission and reflection of a pair of pulses $P_1$ and $P_2$ between object O and target T, target T moving toward object O at a constant velocity. At time $t_1$, first pulse $P_1$ is transmitted from system 11 located at object O to target T, the distance between object O and target T at time $t_1$ being represented by $d_1$. At time $t_2$, pulse $P_1$ hits target T. At time $t_3$, first pulse $P_1$ is received back at object O from target T, the distance therebetween being a third distance $d_3$. Immediately upon reception of pulse $P_1$, second pulse $P_2$ is transmitted from object O towards target T. At time $t_4$, second pulse $P_2$ hits target T, the distance between target T and object O being represented by fourth distance $d_4$. At time $t_5$, pulse $P_2$ is received back at object O, with object O and target T being separated by a fifth distance $d_5$.

It should be noted that conventional attempts to determine the distance between object O and target T have been accomplished commonly by measuring the transit time elapsed from the transmission of a pulse to the detection of its returning echo. The transit time is then used as a linear function of the distance between the two objects. However, under dynamic conditions, this technique would be ineffective because of the significant change in the distance between object O and target T during the transit/measurement time of the pulse.

Specifically, the calculation of the true distance DT (shown as $d_5$ in FIG. 2) between object O and target T by using the transit time ($t_5-t_3$) of second pulse $P_2$ as a linear function of the distance between the two objects would lead to an inaccurate determination. Using the transit time ($t_5-t_3$) of second pulse $P_2$ as a linear function of the distance between the two objects would result in the calculation of an apparent distance DA between object O and target T and not true distance $d_5$. This inaccuracy is a result of the change in the distance DC, (shown as $d_5-d_3$ in FIG. 2), between object O and target T during the time pulse $P_2$ is transmitted and received back by object O. The change in the distance DC between object O and target T during the transit time of pulse $P_2$ from object O to target T and back to object O must be taken into account to convert apparent distance DA to true distance DT. System 11 accounts for the dynamic movement between two objects during the measurement period in the following manner. With the pulse transit times of first and second pulses $P_1$ and $P_2$, respectively, being held in RAM 33 as counter values CVAL1 and CVAL2, respectively, microprocessor 21 makes the following calculations:

First, the values in CVAL1 and CVAL2 are converted to time values TVAL1 and TVAL2, respectively. Since each counter value represents the number of times the counter has been incremented every 0.0001 seconds, time values TVAl1 and TVAL2 can be derived by multiplying each counter value by 0.0001 seconds:

$$TVAL1 \text{ in seconds} = CVAL1 \times 0.0001$$

$$TVAL2 \text{ in seconds} = CVAL2 \times 0.0001$$

Then the apparent distance DA between object O and target T can be calculated using the equation:

$$DA = (\text{velocity of pulse wave} \times TVAL) \div 2$$

In the case of the transmission and reception of an acoustic pulse through air at 20 degrees Celsius where the speed of sound is 1125 feet per second:

$$DA \text{ in feet} = (1125 \times TVAL2) \div 2$$

As noted above, apparent distance DA between object O and target T is not a true indication of the distance between object O and target T under dynamic conditions. Therefore, to calculate the true distance DT (represented by $d_5$ in FIG. 2) between object O and target T, apparent distance DA must be compensated to accommodate for change in distance DC between object O and target T during the transmission and reception of pulse $P_2$. To compensate for dynamic conditions, the relative velocity V in feet per second between object O and target T can be calculated using the following equation:

$$V = -957 + (1468.1 \times (TVAL1 \div TVAL2)) + (-627.4 \times (TVAL1 \div TVAL2)^2) + (116.3 \times (TVAL1 \div TVAL2)^3)$$

Written another way, if $R = (TVAL1 \div TVAL2)$:
$$V = -957 + (1468.1 \times R) + (-627.4 \times R^2) + (116.3 \times R^3)$$

Using relative velocity V in feet per second between object O and target T during the measurement period of the pulse, the change in distance DC between object O and target T during the transit period of the pulse can be calculated using the following equation:

$$DC \text{ in feet} = V \times TVAL2$$

Subsequently thereafter, true distance DT between object O and target T can be calculated using the following equation:

$$DT \text{ in feet} = ((1125 \times TVAL2) - DC) \div 2$$

As an illustration of the foregoing equations, where system 11 is used at 20 degrees Celsius and emits acoustic waves through air, true distance DT can be calculated accordingly:

Where the transit times of the first and second pulses are represented as TVAL1 and TVAL2, respectively, it is suggested that system 11 registers a CVAL1 value of 16326 and a CVAL2 value of 13660. Accordingly:

The time values of TVAL1 and TVAL2 are calculated as:

$$TVAL1 = CVAL1 \times 0.0001 = 16326 \times 0.0001 = 1.6326 \text{ seconds}$$

$$TVAL2 = CVAL2 \times 0.0001 = 13660 \times 0.0001 = 1.3660 \text{ seconds}$$

Therefore, R=(TVAL1÷TVAL2)=(1.6326÷1.3660)= 1.1951

The relative velocity between object O and target T can thus be determined:

$$V = -957 + (1468.1 \times R) + (-627.4 \times R^2) + (116.3 \times R^3) =$$

$$= -957 + 1754.52 - 896.09 + 198.51 = 99.94 \text{ ft/sec}$$

The change in distance DC in feet can then be calculated:

$$DC = 99.94 \times 1.3660 = 136.51 \text{ feet}$$

Therefore, true distance DT in feet can be determined:

$$DT = ((2 \times 768.375) - 136.51) \div 2 = 700.12 \text{ feet}$$

Calculating the standard apparent distance DA accordingly:

$$DA = (1125 \text{ feet/sec} \times 1.3660) \div 2 = 768.375 \text{ feet}$$

would yield a distance error greater that 68 feet when compared to true distance DT value of 700.12 feet derived by using system 11.

After calculating true distance DT between object O and target T, microprocessor 21 can transfer the value of true distance DT to indicator 27.

Upon calculation of true distance DT between object O and target T, microprocessor 21 moves RAM 33 counter value in the CVAL2 register to the CVAL1 register, and resets the CVAL2 register to zero. That is, the old CVAL2 value becomes the new CVAL1 value used in the next set of DT calculations. On reception of third pulse $P_3$, which was transmitted immediately on reception of second pulse $P_2$, the count in counter 31 is stored in the CVAL2 register of RAM 33 and an updated true distance DT can be calculated. The measurement process of system 11 is continuously repeated in a similar manner until the distance between object O and target T reaches a preset level or becomes out of range.

As a possible application, system 11 could be used as a part of an automotive collision avoidance system. As part of an automotive collision system, system 11 would compare the distance and current closing velocity between two vehicles. If the distance and closing velocity were to exceed a preset "safe" level, then the driver could be warned of a potential danger by signaling device such as an audio alarm.

The embodiment of the present invention described above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A method for measuring the true distance and relative velocity between first and second objects, said method comprising the steps of:
   a. measuring a first transit time for the transmission and reflection of a first signal from the first object to the second object and then back to the first object using a transceiver located at the first object, said first transit time being used to determine a first apparent distance between the first and second objects;
   b. measuring a second transit time for the transmission and reflection of a second signal from the first object to the second object and then back to the first object using the transceiver located at the first object, said second transit time being used to determine a second apparent distance between the first and second objects, wherein the second signal is transmitted immediately upon the reflection of the first signal back to the first object;
   c. calculating the relative velocity between the first and second objects using said first and second transit times; and
   d. calculating the true distance between the first and second objects at the time of reflection of the second signal back to the first object by modifying the second apparent distance in accordance with the relative velocity between the first and second objects during the time of transmission and reflection of the second signal.

2. The method of claim 1 wherein the relative velocity between the first and second objects is calculated using a ratio of said first transit time and said second transit time.

3. The method of claim 1 wherein the first and second signals are acoustic signals.

4. The method of claim 1 wherein the first and second signals are ultrasonic signals.

5. An apparatus for measuring the true distance and relative velocity between first and second objects, comprising:
   a. a transceiver located at the first object, said transceiver measuring a first transit time for the transmission and reflection of a first signal from the first object to the second object and then back to the first object, said first transit time being used to determine a first apparent distance between the first and second objects;
   b. wherein said transceiver measures a second transit time for the transmission and reflection of a second signal from the first object to the second object and then back to the first object, said second transit time being used to determine a second apparent distance between the first and second objects, wherein the second signal is transmitted immediately upon the reflection of the first signal back to the first object; and
   c. calculating means for determining the relative velocity between the first and second objects using said first transit time and said second transit time;
   d. wherein said calculating means calculates the true distance between the first and second objects at the time of reflection of the second signal back to the first object by modifying the second apparent distance in accordance with the relative velocity between the first and second objects during the time of transmission and reflection of the second signal.

6. The apparatus of claim 5 wherein the first and second signals are acoustic signals.

7. The apparatus of claim 5 wherein the first and second signals are ultrasonic signals.

8. The apparatus of claim 5 wherein said calculating means comprises a microprocessor.

9. The apparatus of claim 8 wherein the microprocessor of said calculating means comprises a digital-to-analog convertor, a counter, a random access memory, and an arithmetic logic unit.

10. The apparatus of claim 5 wherein said transceiver is a piezo transducer.

* * * * *